Figure 1:
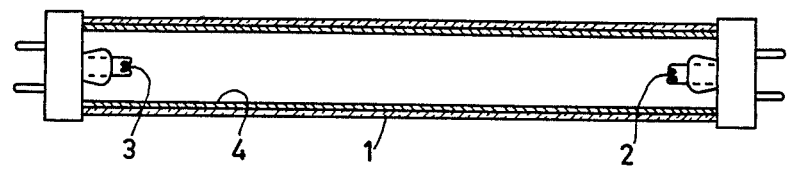

United States Patent [19]
van den Boom et al.

[11] 4,185,222
[45] Jan. 22, 1980

[54] LUMINESCENT BIVALENT EUROPIUM-ACTIVATED BARIUM BOROPHOSPHATE AND DISCHARGE LAMP CONTAINING THE SAME

[75] Inventors: Petrus F. J. van den Boom; Antonius M. J. H. Seuter, both of Eindhoven, Netherlands

[73] Assignee: U.S. Philips Corporation, New York, N.Y.

[21] Appl. No.: 2,434

[22] Filed: Jan. 10, 1979

[30] Foreign Application Priority Data

Jan. 13, 1978 [NL] Netherlands .......................... 7800410

[51] Int. Cl.² ........................... C09K 11/46; H01J 1/63
[52] U.S. Cl. .............................. 313/486; 252/301.4 P; 252/301.4 R; 423/277; 423/305; 428/539
[58] Field of Search ................. 252/301.4 P, 301.4 R; 423/277, 305; 313/486; 428/539, 427

[56] References Cited

U.S. PATENT DOCUMENTS

| | | | |
|---|---|---|---|
| 3,575,879 | 4/1971 | Blasse et al. | 252/301.4 R |
| 3,586,637 | 6/1971 | Blasse et al. | 252/301.4 P |
| 3,599,028 | 8/1971 | Wanmaker et al. | 252/301.4 P X |
| 4,049,992 | 9/1977 | Verstegen et al. | 252/301.4 P X |

Primary Examiner—Jack Cooper
Attorney, Agent, or Firm—Norman N. Spain

[57] ABSTRACT

Luminescent bivalent europium-activated barium borophosphates having defined compositions by the formula $Ba_{3-p}Eu_pBP_3O_{12}$, where $0.01 \leq p \leq 0.50$. A quantity of not more than 20 mole % of the Ba may be replaced by Sr and/or Ca. The borophosphate can be used in luminescent screens of low-pressure mercury vapour discharge lamps.

3 Claims, 2 Drawing Figures

LUMINESCENT BIVALENT EUROPIUM-ACTIVATED BARIUM BOROPHOSPHATE AND DISCHARGE LAMP CONTAINING THE SAME

The invention relates to a luminescent bivalent europium-activated barium borophosphate. Furthermore, the invention relates to a luminescent screen provided with such a borophosphate and to a low pressure mercury vapour discharge lamp having such a luminescent screen.

Netherlands patent application No. 6,808,846 which was laid open to public inspection discloses bivalent europium-activated borophosphates having compositions defined by the formula $(Ba,Sr)_{1-x-y}Ca_xEu_yBPO_5$, wherein $0 \leq x \leq 0.5$ and $0.003 \leq y \leq 0.15$. When excited by shortwave ultra-violet radiation (mainly 254 nm), these substances luminesce in a comparatively narrow band (half value width approximately 35 nm) in the near ultra-violet and blue part of the spectrum with a maximum, dependent on the alkaline earth metals present, at 385-400 nm. The most efficiently luminescing material is the pure Eu-activated barium compound having its emission maximum at 385 nm.

A luminescent bivalent europium-activated barium borate defined by the formula $Ba_{1-q}Eu_qB_8O_{13}$ is disclosed in Netherlands Patent Application 6,806,648 which was laid open to public inspection. In this octaborate, the Ba can be replaced to a maximum of 15 atom % by Sr and/or Ca, which replacement, however, furnishes no practical advantages. This known barium octoborate luminesces in a narrow band (half width value approximately 35 nm) in the short-wave part of the spectrum with a maximum at approximately 400 nm.

Netherlands patent specification No. 152,291 describes luminescent bivalent europium-activated alkaline earth metal pyrophosphates, of which the most efficient are the Sr and/or Ca compounds. The Ba content of these pyrophosphates amounts to not more than approximately 60 atom % of the total quantity of alkaline earth metal and activator metal present. The emission obtained with these known pyrophosphates has again a narrow band (half value width 25 to 30 nm) and is located at short wavelengths (emission maximum at 390–420 nm).

A narrow-band emission in the wavelength range of from 385 to 420 nm as obtained with the above-mentioned known luminescent materials can in general only be used to advantage in special applications, for example in lamps for influencing certain photochemical processes. In a much larger field of application, namely general illumination, there is a need for efficiently luminescing materials emitting in the blue-green to green part of the spectrum.

A luminescent bivalent europium-activated barium borophosphate according to the invention is characterized in that the borophosphate has a composition defined by the formula $Ba_{3-p}Eu_pBP_3O_{12}$, where $0.01 \leq p \leq 0.50$ and wherein not more than 20 mole% of the Ba may be replaced by Sr and/or Ca.

A borophosphate according to the invention can be excited satisfactorily by both short-wave and also long-wave ultra-violet radiation. A very efficient emission can then be obtained consisting of a comparatively wide band (half value width approximately 120 nm) having a maximum at approximately 510 nm. The number of materials having europium emission in this part of the spectrum has been limited so far, and furnishing materials with a very efficient emission in this range therefore furnishes practical advantages.

The host lattice of the borophosphates according to the invention, $Ba_3BP_3O_{12}$, is a novel compound. The X-ray diffraction diagram of this crystalline material deviates totally from that of the prior art barium borophosphate ($BaBPO_5$) and also from that of prior art alkaline earth metal borates and alkaline earth metal phosphates. Substituting large quantities of Sr and/or Ca for Ba results in the formation of side phases which are unwanted, because when activated by europium, they furnish no efficient emissions or only emissions of low efficiency in other parts of the spectrum. The replacement of not more than 20 mole % of the Ba by Sr and/or Ca in a borophosphate according to the invention furnishes no additional advantages and preference is given to the pure barium compound. The europium content p is chosen to be between the above defined limits. For values of p below 0.01, the luminous fluxes obtained are too low, and for values of p exceeding 0.50 the quantum efficiency is reduced by concentration quenching to values which are too small. Preference is given to values of p between 0.02 and 0.20, because then the highest luminous fluxes are obtained.

A luminescent borophosphate according to the invention is preferably used in a luminescent layer provided on the support of a luminescent screen, for example the luminescent screen of a low-pressure mercury vapour discharge lamp. The borophosphates are satisfactorily excited by the ultra-violet radiation (mainly 254 nm) generated in these lamps. In combination with other luminescent materials, these borophosphates can be used in low-pressure mercury vapour discharge lamps for general illumination. Alternatively, it is possible to use the borophosphates in low-pressure mercury vapour discharge lamps for special applications.

Figure 2:
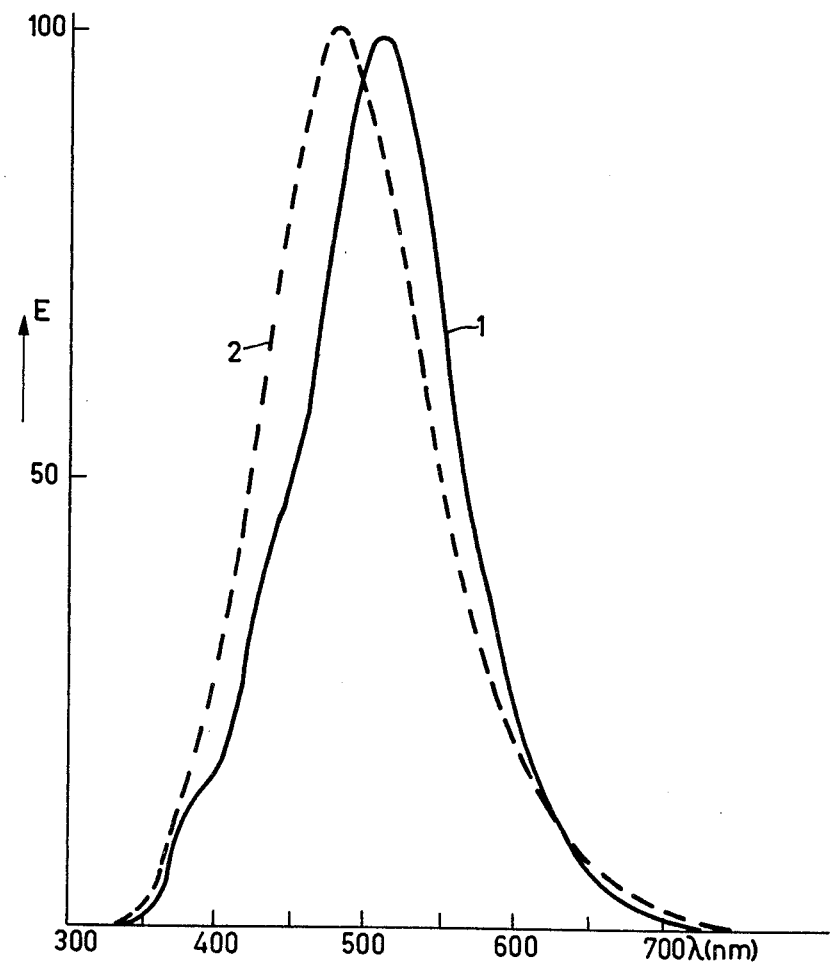

Some embodiments of the invention will now be described with reference to the following Examples, and to the accompanying drawing, in which:

FIG. 1 shows schematically a low-pressure mercury vapour discharge lamp according to the invention, shown partly in longitudinal section, and FIG. 2 shows the spectral energy distribution of the emitted radiation of a borophosphate according to the invention and of a known standard phosphor.

FIG. 1 shows a low-pressure mercury vapour discharge lamp having a glass envelope 1. Electrodes 2 and 3, between which the discharge is maintained, are disposed one at each end of the envelope 1. A luminescent layer 4 is disposed on the inside of the envelope 1 and comprises a luminescent borophosphate according to the invention. The luminescent layer 4 is formed by a method which is conventional in the art.

The luminescent borophosphates according to the invention can be prepared by means of a solid state reaction at a high temperature of a mixture of oxides of the component elements or of compounds which are converted into the corresponding oxides on heating. In general it is advantageous to heat the the starting mixture in two or more steps, the product obtained being pulverized after cooling after each heating operation. The last heating operation is usually performed in a neutral (for example nitrogen) or weakly reducing (for example a nitrogen-hydrogen mixture containing 0.1–5% by volume of hydrogen) atmosphere to obtain the europium in the desired bivalent state. It appeared that the best results are obtained if the starting mixture contains a large excess of boric acid (up to 250 mole %). This excess serves as a melting salt and is driven off from the reaction mixture during the heating operation(s) as a volatile boron compound. If, for example, the alkaline earth metal is added in the form of a fluoride, the excess of boron can be driven off as $BF_3$.

EXAMPLE 1

A mixture is made of
7.732 g $BaF_2$
3.061 g $H_3BO_3$
0.188 g $EuF_3$
5.943 g $(NH_4)_2HPO_4$.

This mixture, which comprises an excess of 230 mole % $H_3BO_3$, was heated for 1 hour in a furnace in air at a temperature of 600° C. After cooling and pulverizing, the product was subjected to a heating operation for 1 hour at 1100° C. in nitrogen. After cooling and pulverizing, a luminescent material having a composition defined by the formula $Ba_{2.94}Eu_{0.06}BP_3O_{12}$ was obtained. From X-ray diffraction photographs, it appeared that the crystalline powder had the crystal structure of the new $Ba_3BP_3O_{12}$-phase. Table 1 shows the d-values (in Å) measured during the X-ray diffraction analysis and the intensities (I in %) of this new phase.

TABLE 1

| d (in Å) | I (in %) | d (in Å) | I (in %) |
| --- | --- | --- | --- |
| 7.15 | 10 | 2.72 | 10 |
| 4.18 | 65 | 2.69 | 5 |
| 3.70 | 100 | 2.57 | 35 |
| 3.58 | 50 | 2.38 | 5 |
| 3.55 | 35 | 2.33 | 25 |
| 3.41 | 70 | 2.28 | 5 |
| 3.33 | 5 | 2.25 | 20 |
| 3.29 | 5 | 2.21 | 40 |
| 3.17 | 20 | 2.19 | 5 |
| 3.05 | 5 | 2.15 | 10 |
| 2.99 | 5 | 2.12 | 5 |
| 2.93 | 30 | 2.09 | 5 |
| 2.82 | 15 | 2.08 | 10 |

EXAMPLES 2 to 6

Luminescent borophosphates having compositions defined by the formula $Ba_{3-p}Eu_pBP_3O_{12}$, having values of p equal to 0.03, 0.075, 0.12, 0.20, and 0.30, respectively, were prepared in the same manner as described in Example 1. The quantity of $EuF_3$ used in the starting mixture was adapted to the desired value of p.

EXAMPLE 7

Example 1 was repeated with the exception, however, that 6.240 g $(NH_4)_2HPO_4$ was used instead of the quantity specified in Example 1. It appeared that a small excess of P in the starting mixture (5 mole % in this case) had a favourable effect on the luminous flux to be obtained.

EXAMPLE 8

The method specified in Example 7 was repeated on a larger scale (approximately 500 g). The starting mixture comprised an excess of 230 mole % $H_3BO_3$ and of 5 mole % $(NH_4)_2HPO_4$ and was fired twice, each time for 2 hours in air at 600° and 800° C., respectively. This was followed by a heating operation in nitrogen for 2 hours at 1100° C. The luminescent borophosphate thus obtained appeared to have the same composition as the material prepared in accordance with Example 1 and appeared to have a quantum efficiency of 80% when excited by short-wave ultra-violet radiation (mainly 254 nm).

Table 2 shows results of measurements at the borophosphates obtained in accordance with Examples 1-8. Besides the europium content p, the table shows for each material the luminous flux LO at excitation by shortwave ultra-violet radiation. The luminous flux is given in percent relative to a standard. As standard is used a luminescent calcium halophosphate activated by antimony and manganese, and mixed with non-luminescent calcium carbonate in such quantities that the luminous flux is reduced to 50% of the luminous flux of the antimony- and manganese-activated calcium halophosphate.

TABLE 2

| Example | p | LO (in %) |
| --- | --- | --- |
| 1 | 0.06 | 214.5 |
| 2 | 0.03 | 191 |
| 3* | 0.075 | 213.5 |
| 4 | 0.12 | 202 |
| 5 | 0.20 | 189 |
| 6 | 0.30 | 169 |
| 7 | 0.06 | 216 |
| 8 | 0.06 | 242 |

*The first firing operation (in air) was performed in this case for 2 hours.

FIG. 2 shows the spectral energy distribution (on excitation with mainly 254 nm) of the borophosphate obtained in accordance with Example 8 (curve 1). FIG. 2 shows by means of a graph the intensity E of the emitted radiation in arbitrary units as a function of the wavelength λ (in nm). For comparative purposes FIG. 2 shows the spectral energy distribution of the known blue-luminescing, antimony-activated calcium halophosphate (dotted curve 2).

The borophosphate obtained in accordance with Example 8 was applied in low-pressure mercury vapour discharge lamps of the 40 W/T 12 type. The initial luminous flux of these lamps was 58.7 1 m/W. After having been in operation for 100 hours the luminous flux was 55.7 1 m/W. By way of comparison it should be noted that the initial luminous flux of lamps having the above-mentioned known blue-luminescing halophosphate is only 51.8 1 m/W, this luminous flux having decreased to 51.3 1 m/W after 100 hours' operation.

EXAMPLES 9 to 12 inclusive

To check the effect of the substitution of strontium and of calcium for part of the barium, luminescent borophosphates were prepared using a method similar to that defined in Example 1. Part of the $BaF_2$ was replaced by $SrF_2$ of $CaF_2$. The following Table 3 shows, for these Examples, in addition to the formula of the material obtained, the results of luminous flux measurements (LO in % relative to the abovementioned standard).

TABLE 3

| Example | formula | LO (in %) |
| --- | --- | --- |
| 9 | $Ba_{2.85}Sr_{0.09}Eu_{0.06}BP_3O_{12}$ | 210 |
| 10 | $Ba_{2.76}Sr_{0.18}Eu_{0.06}BP_3O_{12}$ | 201.5 |
| 11 | $Ba_{2.58}Sr_{0.36}Eu_{0.06}BP_3O_{12}$ | 171.5 |
| 12 | $Ba_{2.64}Ca_{0.30}Eu_{0.06}BP_3O_{12}$ | 138 |

What is claimed is:
1. A luminescent bivalent europium-activated bariumborophosphate, characterized in that the borophosphate has a composition defined by the formula $Ba_3$.

$_p$Eu$_p$BP$_3$O$_{12}$, where $0.01 \leq p \leq 0.50$ and wherein Ba is replaceable by Sr and/or Ca in an amount not exceeding 20 mole% of the Ba.

2. A luminescent screen comprising a substrate bearing a luminescent layer, comprising a borophosphate as claimed in claim 1.

3. A low-pressure mercury vapour discharge lamp having a luminescent screen as claimed in claim 2.

* * * * *